No. 699,406. Patented May 6, 1902.
T. C. ORNDORFF.
VOTE COUNTING FRAME.
(Application filed Feb. 26, 1902.)
(No Model.) 3 Sheets—Sheet 1.
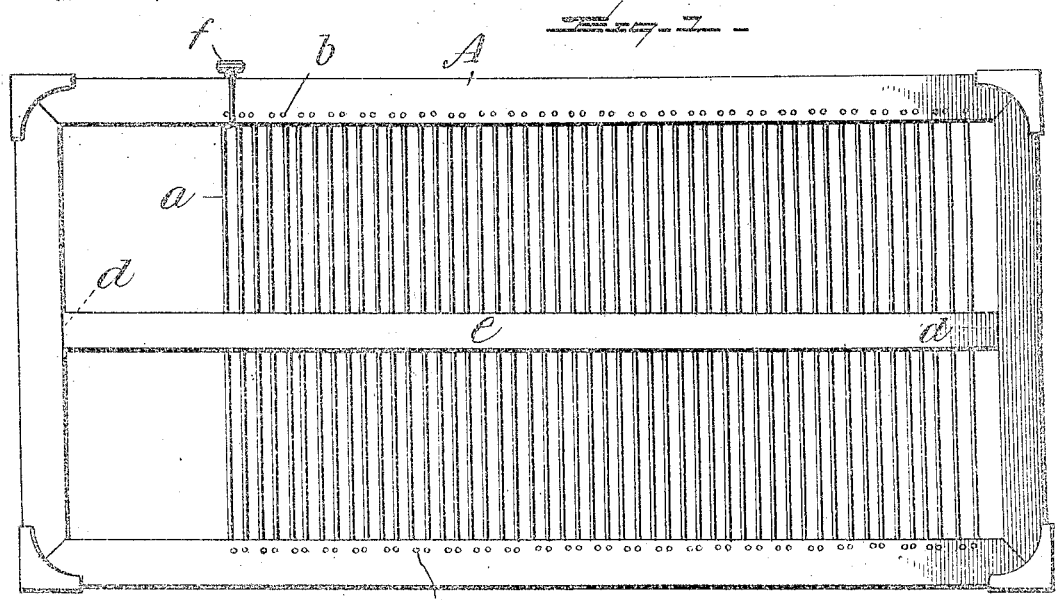
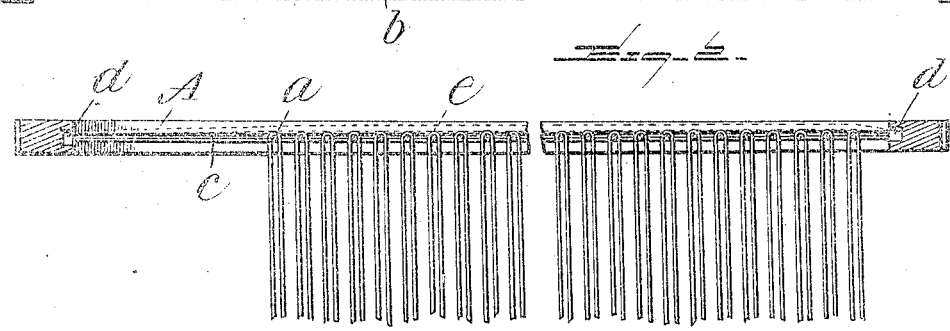
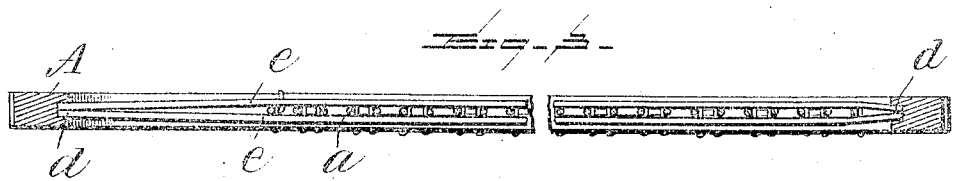
WITNESSES: INVENTOR
Thomas C. Orndorff
BY
Attorney

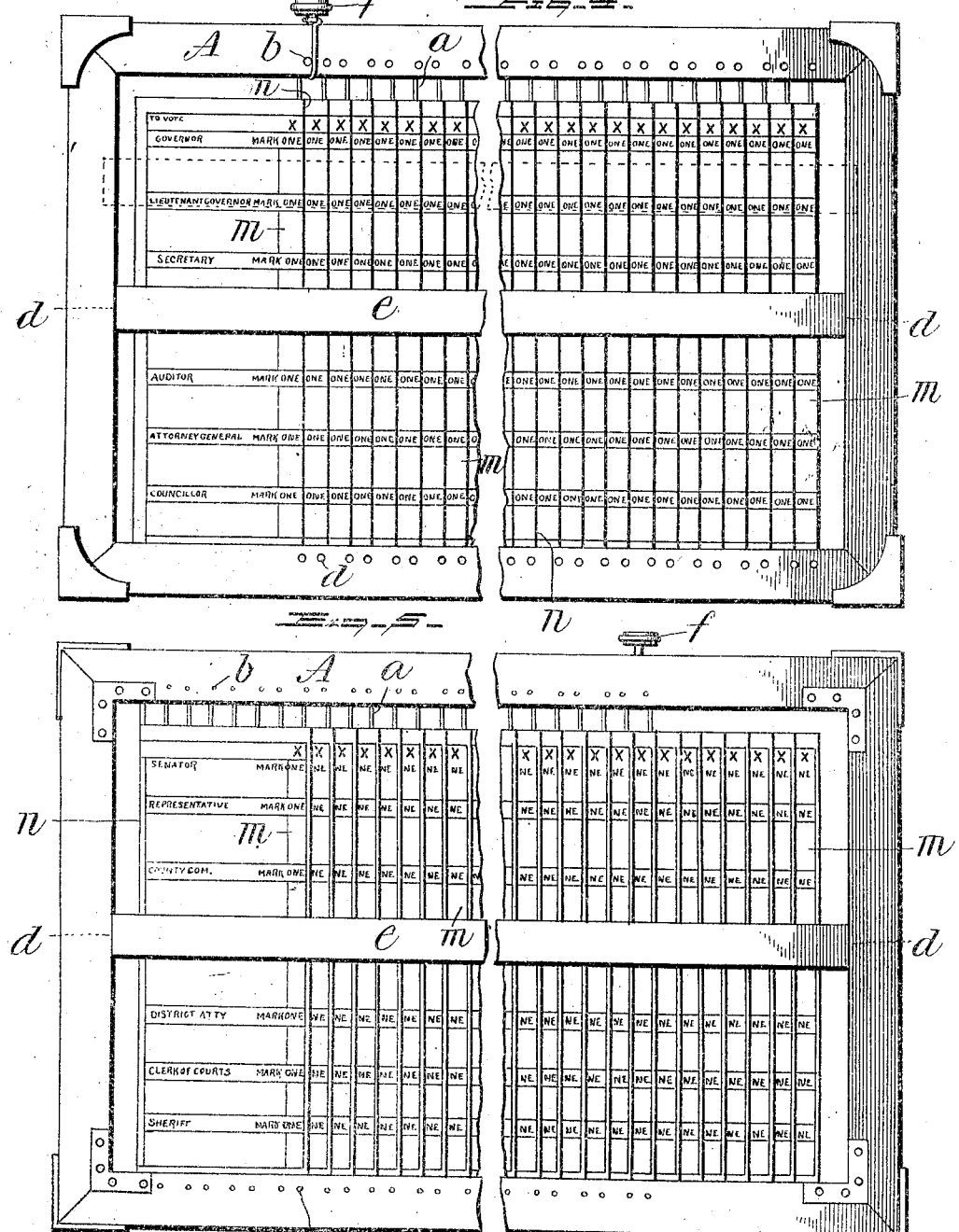

No. 699,406. Patented May 6, 1902.
T. C. ORNDORFF.
VOTE COUNTING FRAME.
(Application filed Feb. 26, 1902.)
(No Model.) 3 Sheets—Sheet 3.
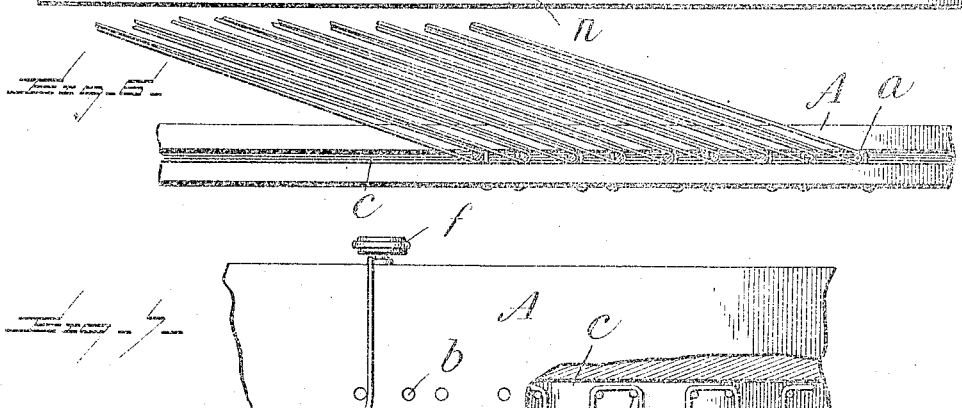
WITNESSES:
INVENTOR
Thomas C. Orndorff
BY
Attorney

UNITED STATES PATENT OFFICE.

THOMAS CORWIN ORNDORFF, OF WORCESTER, MASSACHUSETTS.

VOTE-COUNTING FRAME.

SPECIFICATION forming part of Letters Patent No. 699,406, dated May 6, 1902.

Application filed February 26, 1902. Serial No. 95,785. (No model.)

*To all whom it may concern:*

Be it known that I, THOMAS CORWIN ORNDORFF, a citizen of the United States, and a resident of Worcester, in the county of Worcester and State of Massachusetts, have invented a new and useful Vote-Counting Frame, of which the following is a specification.

In most States in this country it is usual in event of an election to be held to prepare printed ballots bearing the designations of the several offices to be filled, together with the names of the several candidates for each office and a column in which is to be placed a cross or other mark opposite the name of each person voted for. Usually the names are arranged on the ballot in two columns of equal width, and the ballot is longitudinally folded in the middle, which is the dividing line or space between the two columns. Such a ballot is termed "Australian" ballot. To count and classify the vote marks or crosses on such ballots is, as is well known, a lengthy and tiresome undertaking, particularly where a large number of votes are cast and there are many offices to be filled.

It is the object of my invention to facilitate and expedite this work, and this result I attain by means of an appliance the construction and manner of use of which will now be described by reference to the accompanying drawings, forming part of this specification.

In the drawings, Figure 1 is a plan view of the complete device. Fig. 2 is a central longitudinal section of the same, showing the ballots hung in the frame with one of the rulers *e* in dotted lines. Fig. 3 is a central longitudinal section of the complete device. Fig. 4 is a plan view of one face of the frame with the ballots in place therein. Fig. 5 is a like view of the opposite face of the frame with the same ballots in place therein. Fig. 6 is a cross-section of a portion of the frame enlarged, showing how the ballots when strung on the cross wires or lines fold up against one another. Fig. 7 is an enlarged view of a part of the frame, designed to illustrate the manner in which a continuous cord or wire can be strung across the frame. Fig. 8 is a view of the ballot itself.

The frame A itself is an oblong rectangular frame, across which are stretched at equal intervals apart parallel cords or wires *a* or any equivalent device upon which the folded ballot can be hung. I prefer to use a continuous cord which is carried across the frame from one side to the other around pins *b* in the sides of the frame, as shown. The interior opposite edges of the sides of the frame are longitudinally grooved, as at *c*. The pins cross the grooves, and the cord is threaded in the grooves and around the pins. One end of the continuous cord is made fast to the frame and the other end is made fast to a little winding-barrel *f*, which can be turned by hand, so as to take up slack and keep the cord taut. Such in general is the frame. To explain more particularly and in detail, it will be desirable, first, to refer briefly to the ballot itself. A ballot, or so much of it as needed for purposes of explanation, is shown unfolded and spread out in Fig. 8. The names of the offices to be filled are arranged in two parallel columns of equal width, and under each office designation appear the names of the several candidates for that office, while to the right is a column *m*, divided into squares, in which the voter marks a cross opposite to the names of the several candidates for whom he votes. The longitudinal central line of fold of the ballot is indicated at *n*. The actual ballot itself is somewhat large, that from which the representation in Fig. 8 is drawn being actually between thirteen and fourteen inches long and between nine and ten inches wide. Each cord or cross-strip *a* is designed to receive one ballot, which is hung on it as clothes on a line. The width of the frame therefore must be not less in the clear than the length of the ballot. The frame may be long enough and have a sufficient number of cross-strips *a* to accommodate any desired number of ballots. It is customary, however, to handle ballots in bunches of fifty, and the frame therefore need be long enough only to take that number of cross-strips or cords *a*. These cords are spaced from one another at intervals not less in width than the width of the *m* or vote-mark column of the ballot, the reason for which will presently appear. In the interior opposite edges of the end rails of the frame are formed mortises *d* of sufficient capacity to receive the ends of ruler-like elastic strips *e* of wood or other suitable material, which are sprung into said mortises. These strips are applied to the frame on opposite sides of the ballots, (after the latter have been put in the frame,) and they hold between them the ballots.

The manner of use of the frame is as follows: To conveniently fill it with ballots, it is laid down flat, supported only at its ends, and raised far enough above the floor or table upon which it may rest to permit the ballots to hang down from the cross-strips or cords $a$. The folded ballots are then put in place, one on each cord $a$, the ballot straddling the cord and the ballots hanging down parallel with one another, as seen in Fig. 2. The ballots are folded, of course, so as to expose their marked faces or columns, and they are put on the cords $a$ all in the same order and so that like columns of the several ballots shall all face in the same direction. When the frame is thus filled with ballots, one of the binding-strips $e$ can be put in place, and then the frame is raised on end and immediately the ballots fold up flat against one another into what is virtually a sheet which practically fills the frame, as seen in Fig. 4. The other binding-strip $e$ is then put in place, and the ballots are held firmly in position. The heels of the ballots are then all of them alined against the side of the frame that adjoins them. When this has been done, it will be found that all the corresponding divisions of the several ballots are in register and that after the first ballot, which has one of its folded faces completely exposed, all of the remaining ballots have only their $m$ or vote-mark columns exposed and that corresponding divisions in all of these columns are in the same line running lengthwise of the frame, so that by counting the marks in any one of these lines the number of votes (among the fifty ballots cast) for the candidate whose name is opposite that line can at once be ascertained. As a convenient means of facilitating the count the strip $e$ on the face that is exposed can be removed and used as a ruler, so as to expose each line in succession. When the count on one face is concluded, the frame is turned over end for end, so as to expose the other face, as seen in Fig. 5. It will be seen that the same order appears here as on the other face. The second half of the ballot, now on the right of the line, which contains the remaining names and offices, is exposed, while owing to the self-spacing of the rest of the ballots only their $m$ or vote-mark columns are exposed in precisely the same order as on the other face.

With the aid of an appliance of this character votes can be accurately and very speedily counted. In practice two such frames will be used at each voting-booth, one frame to be emptied of and refilled with ballots while the votes in the other frame are being counted.

Having described my invention, what I claim herein as new, and desire to secure by Letters Patent, is—

1. A vote-counting frame, consisting of a frame proper of a width not less than the length of the ballot, and lines or cords secured to and extending across between the sides of the frame parallel with one another and at intervals apart about equal to the width of the $m$ or vote-mark column of the ballot, substantially as and for the purposes hereinbefore set forth.

2. A vote-counting frame consisting of a frame proper of a width not less than the length of the ballot, lines or cords extending across between and secured to the sides of the frame parallel with one another and at intervals apart about equal to the width of the $m$ or vote-mark column of the ballot, mortises in the interior opposite edges of the ends of the frame, and two rules or binding-strips $e$ adapted to be sprung into said mortises, substantially as and for the purposes hereinbefore set forth.

In testimony whereof I have hereunto set my hand this 21st day of February, 1902.

THOMAS CORWIN ORNDORFF.

Witnesses:
E. K. LUNDY, Jr.,
EWELL A. DICK.